United States Patent [19]
Wegner

[11] Patent Number: 5,703,333
[45] Date of Patent: Dec. 30, 1997

[54] SURFACE MOUNT TORQUE LOADCELL

[75] Inventor: Bruce Wegner, North Haven, Conn.

[73] Assignee: Wray-Tech Instruments, Inc., Stratford, Conn.

[21] Appl. No.: 788,042

[22] Filed: Jan. 23, 1997

Related U.S. Application Data

[60] Provisional application No. 60/010,467, Jan. 23, 1996.
[51] Int. Cl.$^6$ .................................................. G01G 19/08
[52] U.S. Cl. ..................... 177/139; 177/141; 73/862.632; 73/862.541
[58] Field of Search ............... 73/862.541, 862.56, 73/862.632, 862.637; 177/139, 141, 145, 146

[56] References Cited

U.S. PATENT DOCUMENTS

| | | | |
|---|---|---|---|
| 4,714,122 | 12/1987 | Appleton et al. | 177/139 |
| 4,771,837 | 9/1988 | Appleton et al. | 177/141 X |
| 4,854,406 | 8/1989 | Appleton et al. | 177/141 X |
| 5,064,008 | 11/1991 | Smith | 177/141 X |
| 5,083,624 | 1/1992 | Reichow | 177/139 |
| 5,119,894 | 6/1992 | Crawford et al. | 177/139 X |
| 5,178,226 | 1/1993 | Bowman et al. | 177/141 X |
| 5,209,313 | 5/1993 | Brodick et al. | 177/139 |
| 5,230,393 | 7/1993 | Mezey | 177/139 |
| 5,245,137 | 9/1993 | Bowman et al. | 177/139 |
| 5,285,020 | 2/1994 | Jurca | 177/141 X |
| 5,285,860 | 2/1994 | Wirth | 177/139 |
| 5,344,272 | 9/1994 | Nuyts | 177/139 X |

*Primary Examiner*—Elizabeth L. Dougherty
*Attorney, Agent, or Firm*—Lee, Mann, Smith, McWilliams, Sweeney & Ohlson

[57] ABSTRACT

An on-board apparatus, system, and method for weighing loads lifted by a lifting apparatus mounted to a vehicle, based upon torque generated on a torque tube. More particularly, the invention is directed toward the mounting of a loadcell in relation to a torque tube of a lifting apparatus mounted on a vehicle, so that the weight of a load lifted by the apparatus can be determined by generating electric signals corresponding and calibrated to the amount of load lifted by the apparatus. In further detail, the apparatus, method, and system of the present invention are provided for on-board weighing of loads collected by refuse vehicles or bulk material haulers. The invention envisions operating to weigh loads statically or dynamically while the load is in motion.

18 Claims, 2 Drawing Sheets

SURFACE MOUNT TORQUE LOADCELL

RELATED APPLICATION

This application claims the benefit of U.S. Provisional Application Ser. No. 60/010,467, filed Jan. 23, 1996.

BACKGROUND OF THE INVENTION

The invention relates to an on-board apparatus, system, and method for weighing loads transported by vehicles. More specifically, the invention is directed toward weighing the load lifted by a lifting apparatus mounted to a vehicle. Even more particularly, the invention is directed toward the mounting of a loadcell in relation to a torque tube of a lifting apparatus mounted on a vehicle, so that the load lifted by the apparatus can be determined by generating electric signals corresponding and calibrated to the mount of load lifted by the apparatus. In further detail, the apparatus, method, and system of the present invention are provided for on-board weighing of loads collected by refuse vehicles. The invention envisions operating to weigh loads statically or dynamically while the load is in motion.

Prior art techniques for weighing loads lifted by a lifting apparatus, e.g. a refuse collection vehicle, have been directed toward measuring the strain (in tension or compression) or deflection of a lift arm of the apparatus. For example, transducers with loadcells have been mounted on forward or rearward arms of a lift apparatus, whereby as a load is lifted the arms experience strain caused by the load. Both beam-type and extensiometer-type of transducers are well-known in the industry, whereby as the lift arms are tensed, or compressed or deflected, the transducers generate an electric signal. The electric signal is calibrated with regard to the particular transducer's properties, so that the loads lifted can be calculated by an on-board computer or other electronic calculation device.

Other forms of on-board weighing devices have included measuring the difference in hydraulic pressure in the hydraulic pressure fluid lines of the lift apparatus during lifting. In this way, pressure transducers are utilized, which similarly send out electric signals that can be calibrated to calculate load.

The prior an use of transducers for measuring deflection and/or strain provide fair results, but there is a need to improve upon the accuracy of on-board weighing systems. Likewise, hydraulic pressure transducer systems offer certain benefits, but there is also a need to improve beyond the accuracy of these types of systems.

Most lifting apparatuses for refuse vehicles include a torque tube that is rotatingly driven to vary the inclination of the trash bin-engaging fork arms attached thereto. It has been discovered that for such lifting apparatus the measurement of the torque that is generated by the trash bin-engaging fork arms on the torque tube provides surprising and very accurate results, which constitutes an extraordinary advance in on-board weighing systems.

SUMMARY OF THE INVENTION

The invention may be described as providing for the attachment of a surface mounted loadcell to the torque tube of a lifting apparatus, which torque tube connects the forward lifting fork arms, that engage a trash or refuse bin for example, to lift arms that pivotally join them. A raise/lower cylinder pivots the torque tubes relative to the lift arms to accordingly rotate the fork arms inclination during lifting and dumping in a known way. The torque tube is pivotally attached to a lift arm usually by means of a pivoting clevis-shaped bracket that is operated to rotate by the action of the raise/lower cylinder drivingly engaged thereto.

As a load is put onto the fork arms of the lifting apparatus, a measurable torque is generated by the fork arms on the torque tube.

The invention further includes the mounting of compression loadcells to the undersides of the fork arms, whereby the center-of-gravity of the load, which is usually off-centered in the refuse bin, is calculated. This measurement is part of the weight-calculating algorithm in addition to the torque measurements, so that accurate weighing is achieved. Among other alternate embodiments an extensiometer may be mounted at one end to a plate mounted on the torque tube adjacent the fork arm and at the other end to a plate mounted on the pivoting bracket.

DETAILED DESCRIPTION OF THE INVENTION

Figure 1:
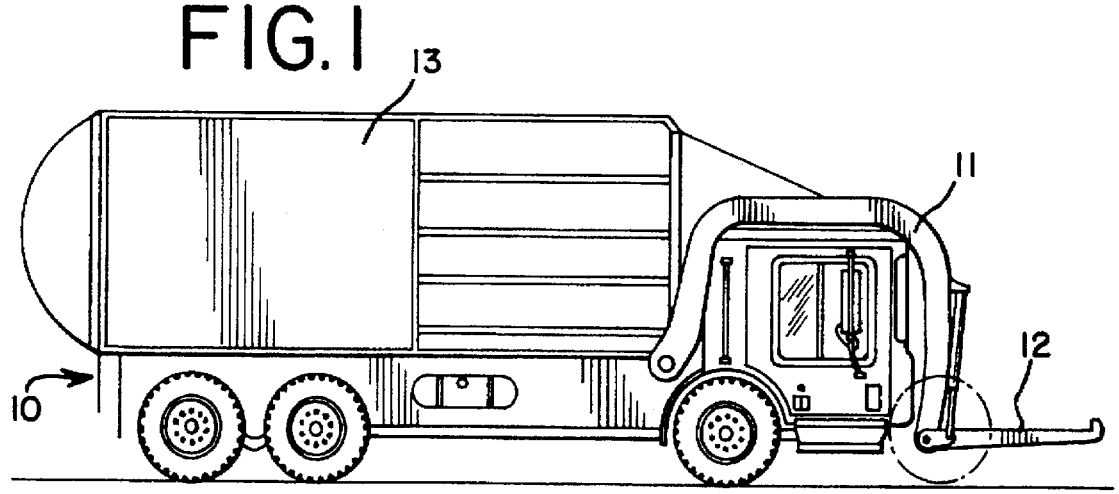
FIG. 1 is an elevational view showing a conventional refuse vehicle with a front end lift apparatus for engaging refuse bins for lifting and dumping the bins into the track hopper, and showing encircled thereon the location of the inventive surface mounted torque sensing device in one form of the present invention.
Figure 2:
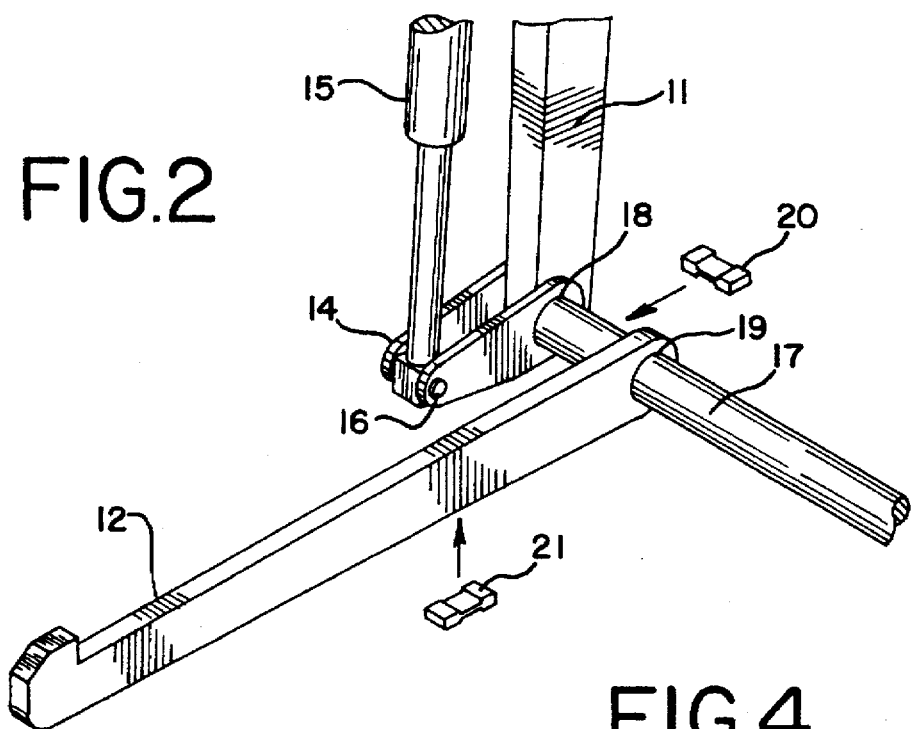
FIG. 2 shows an enlargement of the circled portion of FIG. 1 schematically illustrating the loadcell for surface mounting on the torque tube of the apparatus in an exploded manner and further showing a second loadcell attached to the bottom of the fork arm for purposes of determining load position within the bin, which second loadcell is not a torque sensing device.

FIG. 1 is a side elevational view of a refuse vehicle 10 having front end hydraulic lifting apparatus, including lift arms 11 and fork arms 12. In FIG. 1 it would be understood that the right side of the vehicle is shown. The left side of the vehicle would comprise the other of the pairs of the arms 11 and 12 as would be understood. The fork arms 12 are used to engage a refuse bin to lift it off the ground and pivot it to dispose the contents into the truck hopper 13 in a known way. The fork arms 12 pivot relative to the lift arms 11 so that the trash bin is kept level and does not spill refuse onto the cab during lifting in a known way. The joinder of the lift arms 11 to the fork arms 12 is circled. The encircled portion is shown in an enlarged view comprising FIG. 2. FIG. 2 is a generally schematic view showing the fork arm 12 and lift arm 11 at one side of the refuse vehicle 10. The lift arm 11 is connected by a clevis-like bracket 14 to a fork raise/lower cylinder 15 at pivotal connection 16. The lift arm 11 is also pivotally engaged to a torque tube 17 at a pivotal connection 18. The connection 18 allows the torque tube 17 to rotate during lifting and thereby keep the fork arm 12 level. The fork arm 12 is engaged to the torque tube 17 at a fixed connection 19.

Schematically shown in FIG. 2 is a surface-mounted loadcell 20 exploded away from the torque tube 17. The arrow indicates the location of the mounting of the loadcell 20 to the torque tube 17. A second loadcell 21 is similarly exploded away from the apparatus and, as is indicated by the arrow, intended to be mounted to the underside of the fork arm 12. The loadcell 21 would measure the compression at the underside of the fork arm 12 when a load is engaged and lifted. The loadcell 21 would be provided on both of the parallel fork arms 12 on a refuse vehicle whereby they would send out electric signals corresponding to the value of the compression sensed and thereby the software calculating package in an on-board weighing system would take this into account and calculate where the center-of-gravity of the load would be. Of course, when trash bins are loaded they are not loaded evenly and the determination of the center-of-gravity is important because the torque measured on the torque tube 17 by the loadcells 20 at two points on the torque tube 17 inherently would be different when off center, or eccentric, loading occurs.

Accordingly, the invention also provides for the center-of-gravity calculation in connection with the measurement of torque on the torque tube 17 to provide a highly accurate means for calculating the weight lifted by the refuse vehicle 10.

Figure 3:
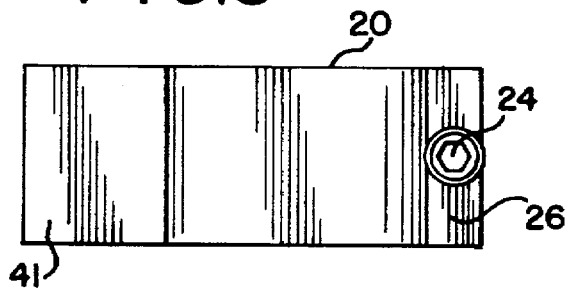
FIG. 3 is a plan view of a loadcell, "C" clamp, striker plate and a ball bearing-tipped adjustment screw.
Figure 4:
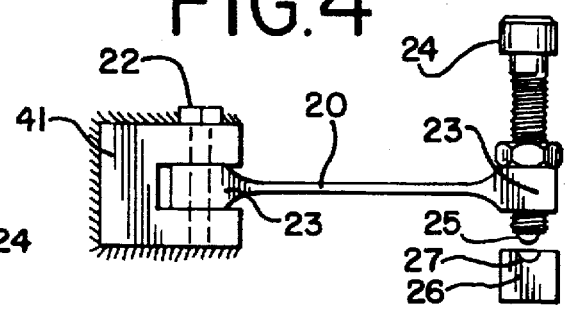
FIG. 4 is a side elevational view of the device as shown in FIG. 3 showing the "C" clamp connection for the loadcell and the adjustment screw over the targeted strike plate.

FIG. 3 is a plan view of a detailed illustration of the loadcell 20. FIG. 4 is a side elevational view of the loadcell 20. The loadcell 20 is mounted at one block end 23 by a "C" clamp 41 between the arms of the "C" and secured by a threaded fastener 22 passing through a bore therein. The other block end 23 of the loadcell 20 is also provided with a threaded bore for receipt of an adjusting screw 24 having a ball bearing-tipped end 25. The ball bearing-tipped end 25 is provided to engage an indentation 27 in a striker plate 26 to locate the ball of the adjusting screw end 25 thereat. The indentation 27 is a target for the end 25. Both the "C" clamp 41 and the striker plate 26 are welded to the surface of the torque tube 17 as will be further seen and understood in regard to FIGS. 5-7.

In the preferred embodiment, the attachment of the "C" clamp 41 and striker plate 26 is by the above-mentioned welding technique, however, it is envisioned that the mounting might also occur by the use of epoxy, or other adhesives, or bolting. The ball bearing-tipped end 25 would be moved by the adjusting screw 24 to engage the targeted indentation 27 on the striker plate 26. The loadcell 20, which is a bending beam type of loadcell, is fixedly supported by the "C" clamp on one side and urged into the indentation 27 on the other. The twisting or torque on the torque tube 17 accordingly may be measured along the bending beam loadcell 20. The present system, apparatus, and method have great advantage because the size and shape of the loadcell 20 and attendant portions 22–27 and 41 can be changed to meet the sizes and loading demands for variously sized lifting apparatuses. The invention also allows for the installation on the torque tube shafts of various sized lifting apparatuses without modifying the torque tubes themselves.

Figure 5:
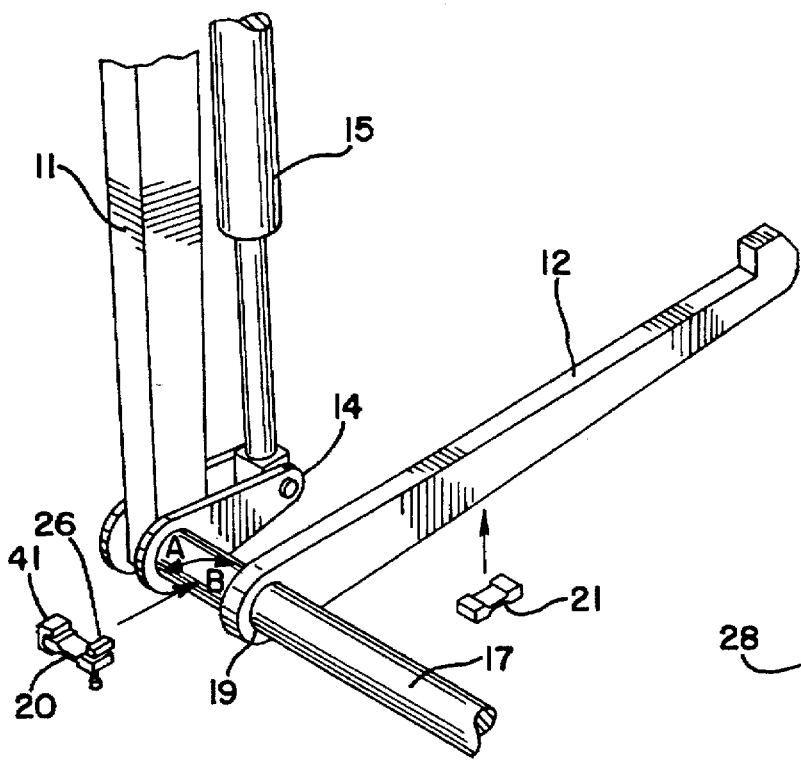
FIG. 5 is an enlarged detailed drawing similar to FIG. 2 and showing the mounting of the loadcell of FIGS. 3 and 4 in an exploded arrangement relative to the torque tube and also showing a second loadcell in an exploded illustration for attachment to the bottom of the fork arm for purposes of determining load position within the bin.
Figure 6:
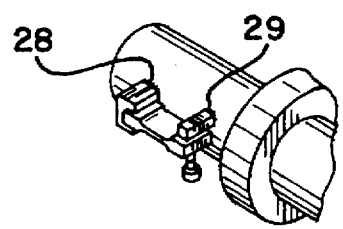
FIG. 6 is a detailed illustration of the attachment of the loadcell of FIGS. 3 and 4 on the torque tube.
Figure 7:
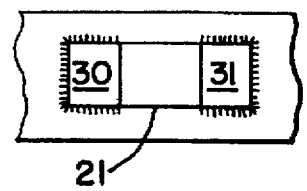
FIG. 7 is a bottom detailed view of the fork arm showing the second loadcell attached to the underside thereof.

FIGS. 5–7 show the attachment of the loadcell 20 and components 22–27 and 41 on the surface of the torque tube 17 by means of welding as shown in FIG. 6 at reference arrows 28 and 29. In FIG. 5, a curved arrow A-B indicates the torque applied on the torque tube 17 by a load engaged on the fork arm 12. The loadcell 20 is mounted between the clevis-shaped bracket 14 and the fork arm 12 in the preferred embodiment. However, the location on the torque tube 17 is not limited to that position. Preferably two loadcells 20 at symmetric points on the torque tube 17 are installed. The loadcell 21 is welded to the under side of the fork arm 12 as shown in the detailed FIG. 7. Opposite ends of the loadcell 21 are block-like end portions 30 and 31, similar to ends 23 of the loadcell 20. The ends 30 and 31 are welded to the fork arm 12. The loadcell 21 is a beam type transducer and has a similar configuration to the loadcell 20, as shown in the side view of FIG. 4.

Figure 8:
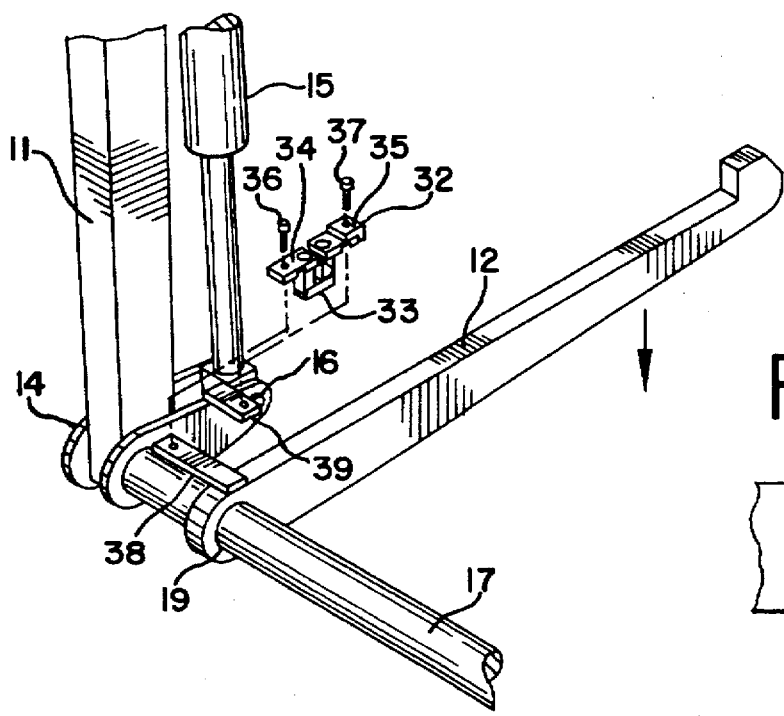
FIG. 8 is another enlarged view showing an alternate embodiment for use with the refuse vehicle shown in FIG. 1 by means of mounting an extensiometer on two separated mounting plates, one arranged at the joinder of the fork arm to the torque tube and the other on the lift bracket near the hydraulic lift cylinder of the lifting apparatus.

FIG. 8 shows a schematic illustration of one alternate embodiment of the invention utilizing an extensiometer 32, an example of which would be marketed under the brand name CEC 100 by PTC Electronics. The extensiometer 32 would include loadcells in the strain sensing portion 33 thereof. Opposite end flanges 34 and 35 are thread engagable by mounting screws 36 and 37 for attachments, respectively, to mounting plates 38 and 39. As shown, the mounting plate 38 is attached to the top of the fork arm 12 generally at the fixed joinder 19 to the torque tube 17. The threaded fasteners 36 would thereby engage the end portion 34 of the extensiometer 32 through an aperture, as shown, of mounting plate 38.

The mounting plate 39 is attached to the clevis-like bracket 14 at a location generally near the pivoting connection 16. The threaded fastener 37 would attach the end portion 35 of the extensiometer 32 through an aperture, as shown, in the mounting plate 39. An arrow indicates the direction of the loading upon the fork arm 12. This loading would force the fork arm 12 to be urged downwardly thereby putting a torque force on the torque tube 17, which is measured by the separation change between the plates 38 and 39 by the extensiometer 32. The extensiometer 32 is envisioned as a conventional type of apparatus well known in the industry, wherein loadcells are arranged in the strain sensing portion 33 as the extensiometer is compressed or tensed in relation to the force on the torque arm 12 causing torque on the torque tube 17 and a changed relative spacing of the plates 38 and 39.

Likewise for the embodiment shown in FIG. 8, loadcells 21 would be provided for mounting to the under sides of the fork arms 12 in order to determine the center-of-gravity of the load carried in the trash bin held on the fork arms 12.

Not shown in the drawings, but as would be understood by one skilled in the art, is that the loadcell 20 and extensiometer 32 are electrically connected to an on-board computer, or other calculation device, whereby they generate electric signals corresponding to the amount of torque on the torque tube 17, which signals are calibrated and then calculated to accurately determine the weight carried by the fork arms 12. Similarly, loadcell 21 is connected to a calculation device providing compression sensing. The system envisions use either for static weighing or dynamically, such as would be obtained as the arms pass by a proximity switch or an inclinometer wherein calculations are made at the same point for all cycles of picking up and dumping the load.

It will be observed in the drawings for the preferred and alternate embodiments of the invention that the loadcells 20 and 21 and the extensiometer 32 are placed in positions that keep them from harmful contact with the fork arms 12 as they engage trail bins and the like. Specifically, in FIGS. 5 and 6, it will be observed that the loadcell 20 is placed at the opposite side of the torque tube 17 from which the fork arms 12 project in the opposite direction. Similarly, the loadcell 21 is mounted to the underside of the fork arm 12 and therefore away from the upper surface that engages the load to be lifted. In FIG. 8, it will be also noted that the extensiometer 32 is mounted on the plates 38 and 39 behind the raise/lower cylinder 15 and therefore rearwardly of the portions of the fork arms 12 that would receive the load, i.e. ahead of the raise/lower cylinders 15 at either side of the refuse vehicle 10. These safe placements of the loadcells and extensiometer are provided to prevent impact damage as loads are being lifted. However, the invention is not limited to these locations and could be placed elsewhere on the torque tube 17 and fork arms 12. These locations shown in the figures are therefore preferred to avoid impact damage.

Other embodiments and equivalent systems, apparatuses and methods are envisioned within the scope of the invention.

What is claimed is:

1. A weighing system for use on a load with a vehicle-mounted lifting apparatus having a lift arm assembly and a torque tube, which is pivotally attached to the lift arm assembly and is fixedly attached to an arm of the lift arm assembly, the weighing system comprising:

a torque sensing device that generates a first electric signal that corresponds to the torque that is generated on the torque tube; and an on-board electronic calculation device that is supplied the electric signal and that calculates the weight of the load.

2. The weighing system of claim 1, further including a compression sensing loadcell attached to an arm of the lift arm assembly; the compression sensing loadcell generating a second electric signal that corresponds to the position of the load by measuring the compression of the arm to which it is attached when the load is lifted.

3. The weighing system of claim 2, wherein the compression sensing loadcell provides data used to determine center-of-gravity of the load.

4. The weighing system of claim 1, wherein the torque sensing device is a bending beam loadcell.

5. The weighing system of claim 4, wherein the bending beam loadcell is surface mounted.

6. The weighing system of claim 4, wherein two bending beam loadcells are installed at symmetric points on the torque tube.

7. The weighing system of claim 2, wherein the apparatus has two parallel fork arms, each arm having its own compression sensing loadcell, and wherein two torque sensing devices are installed at symmetric points on the torque tube.

8. The weighing system of claim 1, wherein the torque sensing device is an extensiometer.

9. The weighing system of claim 8, wherein the extensiometer includes a strain sensing portion with a second loadcell located thereon.

10. The weighing system of claim 2, wherein the compression sensing loadcell is attached to the bottom of the arm.

11. A refuse collection vehicle having a hydraulically operated lifting apparatus, including at least one lift arm for lifting, dumping, and lowering a refuse container, and a fork arm and a torque tube, which is pivotally attached to the lift arm and is fixedly attached to the fork arm, and a weighing system for weighing the loaded refuse container as it is lifted and loaded and the empty container as it is being lowered, the weighing system including:

a surface-mounted, bending beam loadcell attached to the torque tube; the bending beam loadcell generating a first electric signal that corresponds to the torque that is generated by the fork arm on the torque tube a compression sensing loadcell attached to the fork arm; the compression sensing loadcell generating a second electric signal that corresponds to the container's center-of-gravity by measuring the compression of the fork arm when the container is lifted; and a computer connected to the loadcells receiving the electric signals, therewith calculating the weight of the container.

12. A method for weighing a load on a lifting apparatus mounted to a vehicle, wherein the lifting apparatus includes a lift arm assembly and a torque tube that is pivotally attached to the lift arm assembly, the method comprising the steps of:

lifting the load by means of an arm of the lift arm assembly;

measuring torque, which is generated by the load on the torque tube;

generating a first electric signal corresponding to and calibrated to the amount of torque on the torque tube; and calculating the weight of the load lifted by the lift arm assembly with an electronic calculation device using the electric signals.

13. The method for weighing the load of claim 11, further comprising the steps of:

determining the position of the load using a compression sensing loadcell attached to an arm of the lift arm assembly; and generating a second electric signal corresponding to the value of the compression sensed, wherein a software calculating package takes into account the compression sensed and calculates the center-of-gravity of the load.

14. The method for weighing the load of claim 12, wherein measuring the torque on the torque tube is performed by a bending beam loadcell.

15. The method for weighing the load of claim 12, wherein measuring the torque on the torque tube is performed by an extensiometer.

16. A method for installing a weighing system on a lifting apparatus mounted to a vehicle, wherein the lifting apparatus includes a lift arm assembly and a torque tube that is pivotally attached to the lift arm assembly, the method comprising the steps of:

mounting a torque sensing device that generates a first electric signal that corresponds to the torque that is generated on the torque tube; and electrically connecting the torque sensing device to an on-board electronic calculation device that is supplied the electric signal and that calculates the weight of a load.

17. A method for installing the weighing system on the lifting apparatus of claim 16 further comprising the step of:

attaching a compression sensing loadcell to an arm of the lift arm assembly; the compression sensing loadcell generating a second electric signal that corresponds to the position of a load by measuring the compression of the arm to which it is attached when the load is lifted; and electrically connecting the compression sensing loadcell to the on-board electronic calculation device.

18. A hauler vehicle having a lifting apparatus, including at least one offset lift arm for lifting an object, and a torque tube, which is attached to the lift arm, and a weighing system for weighing the object, the weighing system including:

a loadcell attached to the torque tube that generates an electric signal that corresponds to the torque that is generated on the torque tube; and a computer connected to the loadcell receiving the electric signal, therewith calculating the weight of the object using a predetermined value for the position of the object with respect to the loadcell.

* * * * *